(12) United States Patent
Ko et al.

(10) Patent No.: US 9,060,283 B2
(45) Date of Patent: Jun. 16, 2015

(54) METHOD AND DEVICE FOR TRANSMITTING/RECEIVING CHANNEL STATE INFORMATION IN WIRELESS COMMUNICATION SYSTEM SUPPORTING MULTICARRIERS

(75) Inventors: Hyunsoo Ko, Anyang-si (KR); Jaehoon Chung, Anyang-si (KR); Minseok Noh, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/702,900

(22) PCT Filed: Jun. 9, 2011

(86) PCT No.: PCT/KR2011/004231
§ 371 (c)(1),
(2), (4) Date: Dec. 7, 2012

(87) PCT Pub. No.: WO2011/155777
PCT Pub. Date: Dec. 15, 2011

(65) Prior Publication Data
US 2013/0077523 A1 Mar. 28, 2013

Related U.S. Application Data

(60) Provisional application No. 61/353,168, filed on Jun. 9, 2010.

(51) Int. Cl.
*H04W 24/00* (2009.01)
*H04L 5/00* (2006.01)
*H04L 1/00* (2006.01)
*H04W 72/04* (2009.01)

(52) U.S. Cl.
CPC .............. *H04W 24/00* (2013.01); *H04L 1/0026* (2013.01); *H04W 72/0413* (2013.01);

(Continued)

(58) Field of Classification Search
CPC ............ H04W 72/0413; H04W 24/00; H04W 72/042; H04L 5/001; H04L 1/0027; H04L 1/0029; H04L 1/0026
USPC .......................................... 370/252, 329, 522
See application file for complete search history.

(56) References Cited

U.S. PATENT DOCUMENTS 7,710,893 B2 * 5/2010 Yoon et al. ..................... 370/252
8,774,224 B2 * 7/2014 Lee et al. ....................... 370/480

(Continued)

FOREIGN PATENT DOCUMENTS

KR 10-2009-0017963 A 2/2009
KR 10-2009-0076784 A 7/2009

*Primary Examiner* — Christopher Grey
(74) *Attorney, Agent, or Firm* — McKenna Long & Aldridge LLP

(57) ABSTRACT

The present invention relates to a wireless communication system, and more particularly, discloses a method and a device for transmitting/receiving channel state information in a wireless communication system supporting multicarriers. The method for transmitting downlink channel state information in the wireless communication system supporting downlink multicarriers, according to one embodiment of the present invention, comprises the following steps: receiving from at least one downlink carrier an uplink grant downlink control information (DCI) including a request for the channel state information; measuring the channel state information of at least one first type downlink carrier; and transmitting the measured channel state information on a physical uplink shared channel (PUSCH) resource indicated by the uplink grant DCI, wherein the downlink multicarriers comprise the first type downlink carrier and a second type downlink carrier, wherein the channel state information on the second type downlink carrier may not be transmitted.

15 Claims, 11 Drawing Sheets

(52) U.S. Cl.
CPC ............ *H04L 5/001* (2013.01); *H04L 1/0027* (2013.01); *H04L 1/0029* (2013.01); *H04L 1/0031* (2013.01); *H04W 72/042* (2013.01)

(56) References Cited

U.S. PATENT DOCUMENTS

| | | |
|---|---|---|
| 2005/0232156 A1 | 10/2005 | Kim et al. |
| 2008/0062920 A1 | 3/2008 | Pi et al. |
| 2010/0135181 A1* | 6/2010 | Earnshaw et al. ............ 370/252 |
| 2010/0297993 A1* | 11/2010 | Heo et al. ...................... 455/423 |
| 2011/0002281 A1* | 1/2011 | Terry et al. .................... 370/329 |
| 2011/0019637 A1* | 1/2011 | Ojala et al. .................... 370/329 |
| 2011/0249584 A1* | 10/2011 | Barbieri et al. ............... 370/252 |
| 2012/0113831 A1* | 5/2012 | Pelletier et al. ............... 370/252 |
| 2012/0220286 A1* | 8/2012 | Chen et al. ................. 455/422.1 |
| 2014/0133474 A1* | 5/2014 | Damnjanovic et al. ....... 370/336 |
| 2015/0043458 A1* | 2/2015 | Seo et al. ...................... 370/329 |

* cited by examiner (a)

(b)

METHOD AND DEVICE FOR TRANSMITTING/RECEIVING CHANNEL STATE INFORMATION IN WIRELESS COMMUNICATION SYSTEM SUPPORTING MULTICARRIERS

This Application is a 35 U.S.C. §371 National Stage Entry of International Application No. PCT/KR2011/004231 filed Jun. 9, 2011 and claims the benefit of U.S. Provisional Application No. 61/353,168 filed Jun. 9, 2010, all of which are incorporated by reference in their entirety herein.

TECHNICAL FIELD

The present invention relates to a wireless communication system, and more particularly, to a method and apparatus for transmitting and receiving channel state information in a wireless communication system supporting multiple carriers.

BACKGROUND ART

Multiple-Input Multiple-Output (MIMO) is a scheme that can increase transmission/reception data efficiency by employing a plurality of transmission antennas and a plurality of reception antennas, beyond the traditional use of a single transmission antenna and a single reception antenna. That is, a transmitting end or a receiving end increases capacity or improves performance by use of multiple antennas. Thus, MIMO is also called a multi-antenna technology. For reliable multi-antenna transmission, the transmitting end needs to receive a channel information feedback from the receiving end.

While a single carrier is configured for each of uplink and downlink in a legacy wireless communication system, the introduction of Carrier Aggregation (CA) or a multi-carrier technology that aggregates a plurality of carriers is under discussion in order to support an extended bandwidth.

DISCLOSURE

Technical Problem

Along with the introduction of the multi-carrier technology, it is necessary to define a method for feeding back channel state information.

An object of the present invention devised to solve the conventional problem is to provide a specific method for, when channel state information about one or more downlink carriers is measured and reported, indicating a downlink carrier about which channel state information is to be measured and reported, and a specific rule for measuring and reporting rank information, precoding matrix information, and channel quality information included in channel state information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting downlink Channel State Information (CSI) in a wireless communication system supporting multiple downlink carriers includes receiving uplink grant Downlink Control Information (DCI) including a CQI request on one or more downlink carriers, measuring CSI for one or more first-type downlink carriers, and transmitting the measured CSI in Physical Uplink Shared Channel (PUSCH) resources indicated by the uplink grant DCI. The multiple downlink carriers include the first-type downlink carriers and second-type downlink carriers and CSI for the second-type downlink carriers are not transmitted.

In another aspect of the present invention, a user equipment for transmitting downlink CSI in a wireless communication system supporting multiple downlink carriers includes a reception module for receiving a downlink signal from a base station, a transmission module for transmitting an uplink signal to the base station, and a processor for controlling the user equipment including the reception module and the transmission module. The processor is configured to receive uplink grant DCI including a CQI request on one or more downlink carriers through the reception module, measure CSI for one or more first-type downlink carriers, and transmit the measured CSI in PUSCH resources indicated by the uplink grant DCI through the transmission module. The multiple downlink carriers include the first-type downlink carriers and second-type downlink carriers and CSI for the second-type downlink carriers are not transmitted.

The followings are applicable commonly to the above embodiments of the present invention.

The first-type downlink carriers may be downlink carriers used in downlink data transmission and the second-type downlink carriers may be downlink carriers unused in the downlink data transmission.

The first-type downlink carriers may be downlink carriers that carry the uplink grant DCI and the second-type downlink carriers may be downlink carriers that do not carry the uplink grant DCI.

The first-type downlink carriers may be set by higher-layer signaling.

CSI for each of the one or more first-type downlink carriers may be transmitted in a different uplink subframe.

An independent mode may be applied to each of the one or more first-type downlink carriers.

The CSI may be measured with an independent granularity for each of the one or more first-type downlink carriers.

Independent rank information may be reported for each of the one or more first-type downlink carriers. Herein, the rank information for each of the one or more first-type downlink carriers may be separately encoded and modulated with the same modulation order.

The CSI may be transmitted for the one or more first-type downlink carriers in a first uplink transport block indicated by the downlink control information and uplink data may be transmitted in a second transport block that is not indicated by the downlink control information. Herein, only the CSI may be transmitted in the first uplink transport block and the uplink data and the CSI may be transmitted in the second uplink transport block. A CQI and a Rank Indicator (RI) for the one or more first-type downlink carriers may be transmitted in the first uplink transport block. Or the CQI for the one or more first-type downlink carriers may be transmitted in the first uplink transport block and the RI for the one or more first-type downlink carriers may be repeatedly transmitted in the first uplink transport block and the second uplink transport block. The downlink control information indicating the first uplink transport block may include a Modulation and Coding Scheme (MCS) level index ($I_{MCS}$) set to 29 for the one or more first-type downlink carriers.

The above overall description and a later detailed description of the present invention are purely exemplary and given as an additional description of the present invention determined by the appended claims.

Advantageous Effects

According to the present invention, when channel state information about one or more downlink carriers is measured and reported, a specific method for indicating a downlink carrier about which channel state information is to be measured and reported and a specific rule for measuring and reporting rank information, precoding matrix information, and channel quality information included in channel state information can be provided. Therefore, a method and apparatus for transmitting and receiving channel state information efficiently and accurately in a multi-carrier environment can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
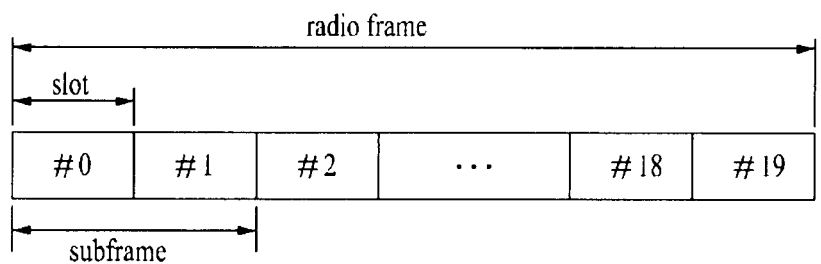
FIG. 1 illustrates the structure of a radio frame in a $3^{rd}$ Generation Partnership Project Long Term Evolution (3GPP LTE) system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'BS' may be used as a concept covering a cell or sector. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS) ', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

FIG. 1 illustrates a radio frame structure in the 3GPP LTE system. A radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
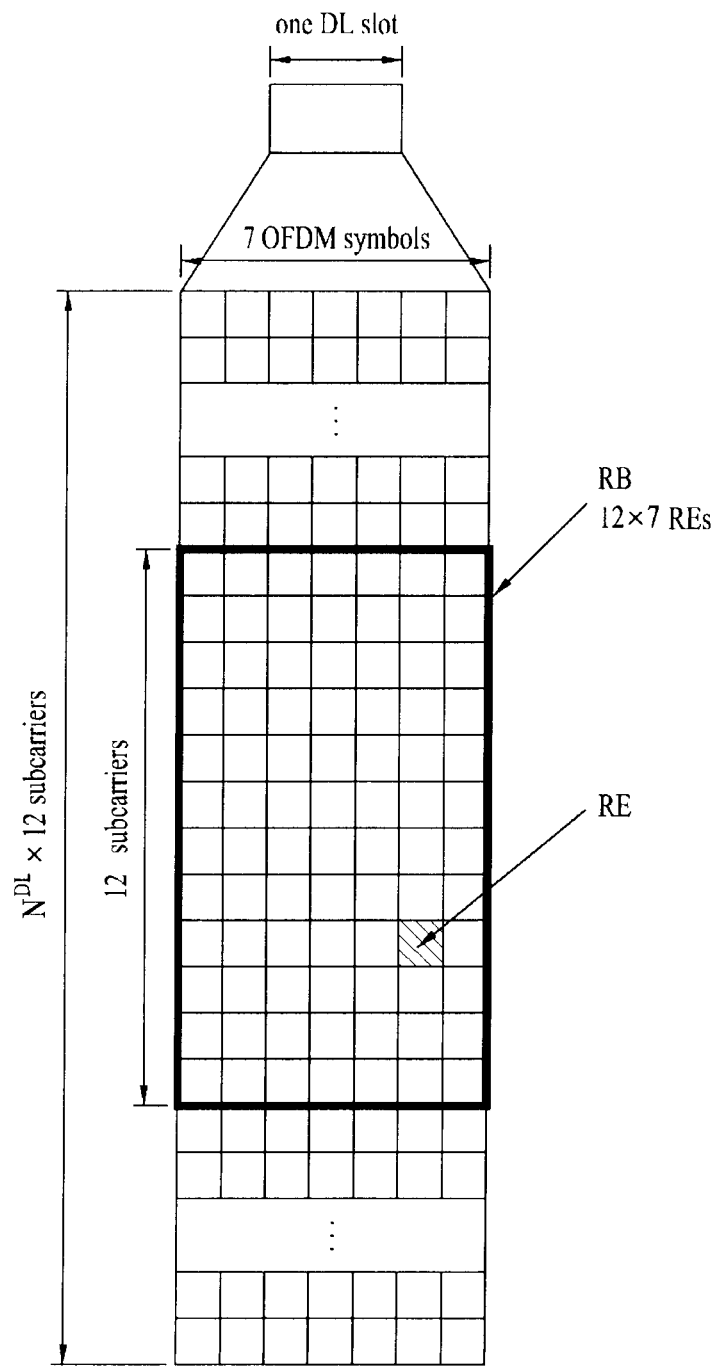
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
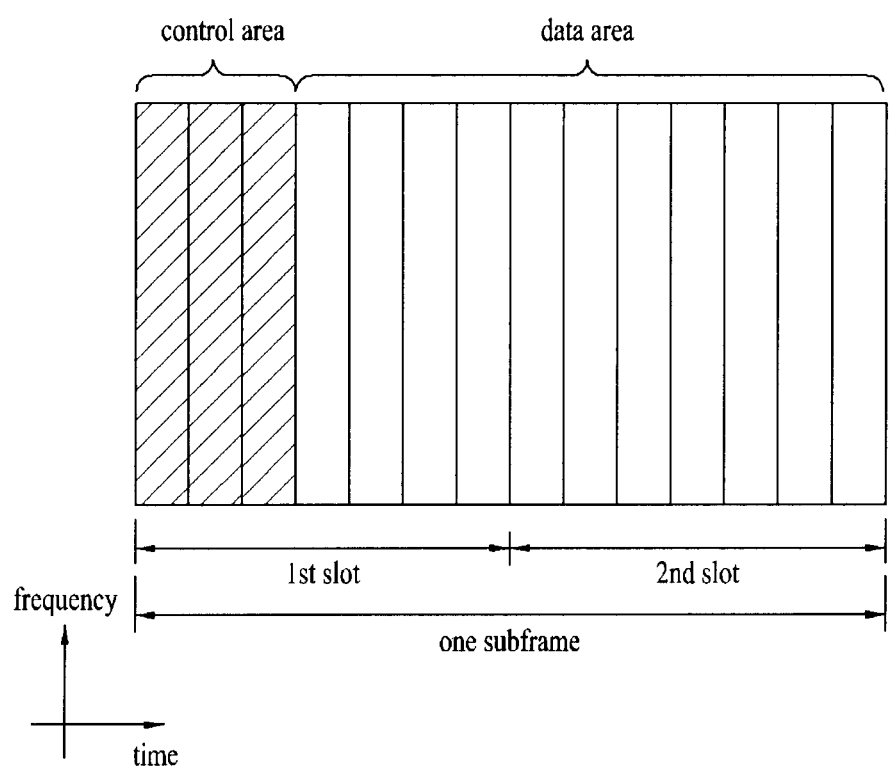
FIG. 3 illustrates the structure of a downlink subframe.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PCFICH), a Physical Downlink Control Channel (PDCCH), and a Physical Hybrid automatic repeat request (HARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
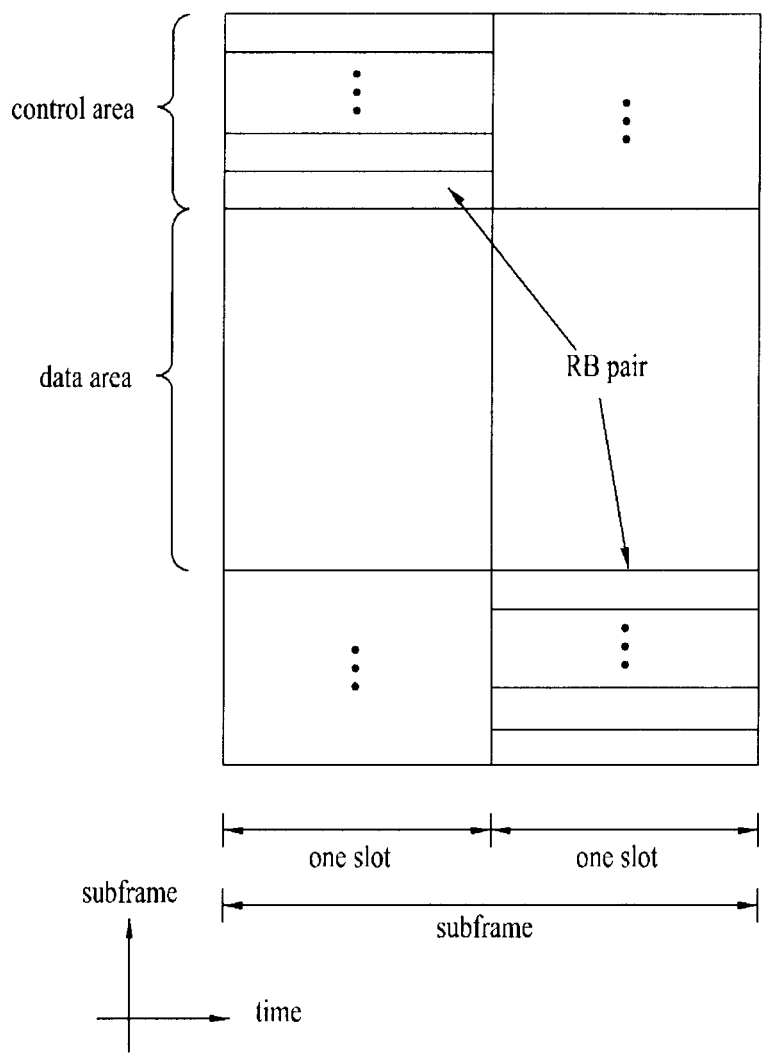
FIG. 4 illustrates the structure of an uplink subframe.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Carrier Aggregation

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a wider logical band.

Carrier aggregation was introduced to support increased throughput, prevent cost increase caused by introduction of wideband Radio Frequency (RF) devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may be applied to each of downlink and uplink. Carrier aggregation may support a system bandwidth of up to 100 MHz by aggregating up to five CCs each having a bandwidth of 5, 10 or 20 MHz. CCs may be configured in contiguous or non-contiguous frequencies.

In the specification, a downlink carrier and an uplink carrier may be represented as a DL CC or DL cell and a UL CC or UL cell, respectively.

Downlink carrier aggregation may be described as an eNB's support of for downlink transmission to a UE in frequency resources (subcarriers or Physical Resource Blocks (PRBs)) of one or more carrier bands in time resources (allocated in units of a subframe). Uplink carrier aggregation may be described as a UE's support of uplink transmission to an eNB in frequency resources (subcarriers or PRBs) of one or more carrier bands in time resources (allocated in units of a subframe).

Figure 5:
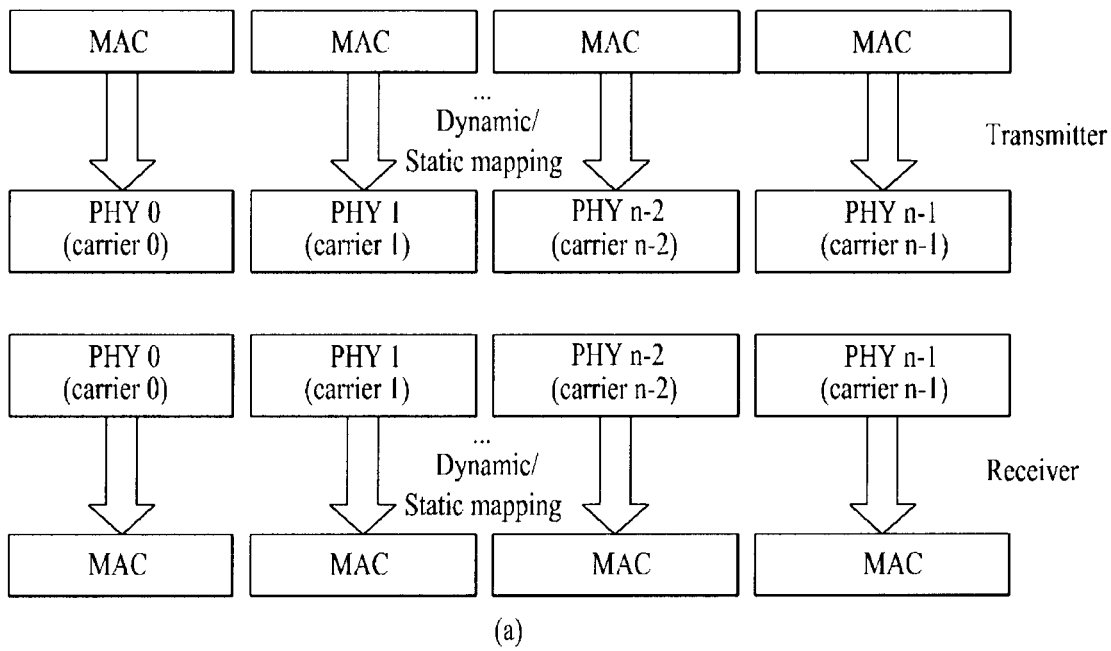
FIG. 5 is a view referred to for describing the configurations of a physical layer (L1) and a Medium Access Control (MAC) layer (L2) in a multi-carrier system.
Figure 5:
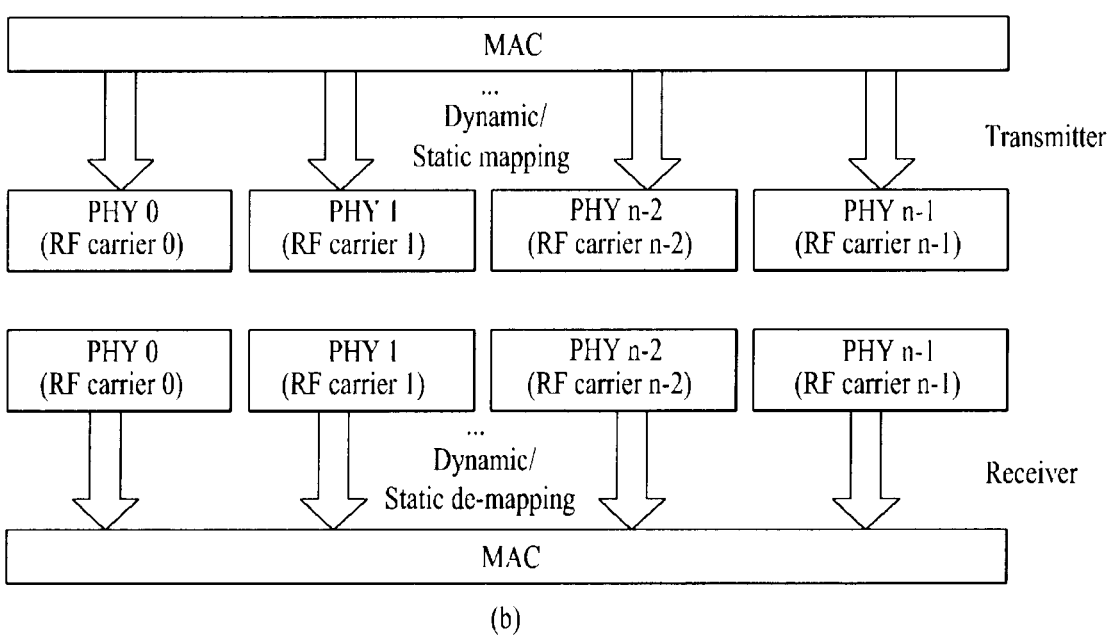

With reference to FIG. 5, the configurations of a physical layer (first layer, L1) and a Medium Access Control (MAC) layer (second layer, L2) of a multi-carrier system will be described. In a legacy wireless communication system supporting a single carrier, an eNB may include one physical layer (PHY) entity capable of supporting one carrier, and one MAC entity for controlling one PHY entity. For example, baseband processing may be carried out in the PHY layer. For example, a transmitter may create a MAC Protocol Data Unit (PDU) and perform an L1/L2 scheduler operation including MAC/Radio Link Control (RLC) sub-layers in the MAC layer. The MAC PDU packet block of the MAC layer is converted into a transport block through a logical transport layer, such that the resultant transport block is mapped to a physical layer input information block. In FIG. 5, the MAC layer is represented as the entire L2 layer, and may conceptually cover MAC/RLC/Packet Data Convergence Protocol (PDCP) sub-layers. For convenience of description and better understanding of the present invention, the above-mentioned application may be used interchangeably in the MAC layer description of the present invention.

On the other hand, a multi-carrier system may provide a plurality of MAC-PHY entities. That is, as can be seen from FIG. 5(a), the transmitter and receiver of the multi-carrier system may be configured in such a manner that one MAC-PHY entity is mapped to each of n CCs. Since an independent PHY layer and an independent MAC layer are assigned to each CC, the PHY layer creates a PDSCH with a MAC PDU on a CC basis.

Alternatively, the multi-carrier system may provide one common MAC entity and a plurality of PHY entities. That is, as illustrated in FIG. 5(b), the multi-carrier system may configure a transmitter and a receiver in such a manner that n PHY entities respectively correspond to n CCs and one common MAC entity controls the n PHY entities. In this case, a MAC PDU from one MAC layer may be branched into a plurality of transport blocks corresponding to a plurality of CCs through a transport layer. Or, when generating a MAC PDU in the MAC layer or when generating an RLC PDU in the RLC layer, the MAC PDU or RLC PDU may be branched into individual CCs. As a result, the PHY layer generates a PDSCH on a CC basis.

A PDCCH for transmitting L1/L2 control signaling control information generated from a packet scheduler of the MAC layer may be mapped to physical resources of each CC, for transmission. A PDCCH carrying control information (a DL assignment or a UL grant) related to PDSCH or PUSCH transmission for a specific UE may be separately encoded on every CC carrying the PDSCH/PUSCH. The PDCCHs may be called separately coded PDCCHs. On the other hand, control information related to PDSCH/PUSCH transmission on several CCs may be configured into one PDCCH, for transmission. This PDCCH may be called a jointly coded PDCCH.

To support carrier aggregation, a connection needs to be established or a connection setup needs to be prepared between an eNB) and a UE (or RN) so that a control channel (PDCCH or PUCCH) and/or a shared channel (PDSCH or PUSCH) can be transmitted. In order to establish a connection with a specific UE or RN, a carrier needs to be measured and/or reported and thus CCs to be measured and/or reported may be assigned. In other words, CC assignment means that CCs are configured (the number and indexes of CCs are indicated) for use in DL/UL transmission, from among UL/DL CCs configured by an the eNB, taking into account not only the capabilities of a specific UE (or RN) but also a system environment.

If CC assignment is controlled in the Layer 3 (L3) Radio Resource Management (RRM), UE-specific or RN-specific RRC signaling may be used. Alternatively, cell-specific or cell cluster-specific RRC signaling may be used. If dynamic control such as CC activation/deactivation settings is needed for CC assignment, a predetermined PDCCH may be used for L1/L2 control signaling, or a dedicated physical control channel for CC assignment control information or a PDSCH taking the form of an L2 MAC message may be used. On the other hand, if CC assignment is controlled by a packet scheduler, a predetermined PDCCH may be used for L1/L2 control signaling, a physical control channel dedicated for CC assignment control information may be used, or a PDSCH taking the form of an L2 MAC message may be used.

Because one or more carriers (or cells) managed by one MAC entity as illustrated in FIG. 5(b) are not necessarily contiguous, it is possible to implement non-contiguous carrier aggregation flexibly in terms of frequency management.

Different Uplink Bandwidth (UL BW) and Downlink Bandwidth (DL BW) may be configured. Configuration of equal UL BW and DL BW is called symmetric UL/DL BW configuration. For the symmetric UL/DL BW configuration, the same number of PHY channels may be configured for the uplink and the downlink. If the uplink and the downlink are configured to have different numbers of PHY channels, a link having more PHY channels gets a higher data throughput. This is called asymmetric UL/DL BW configuration.

Figure 6:
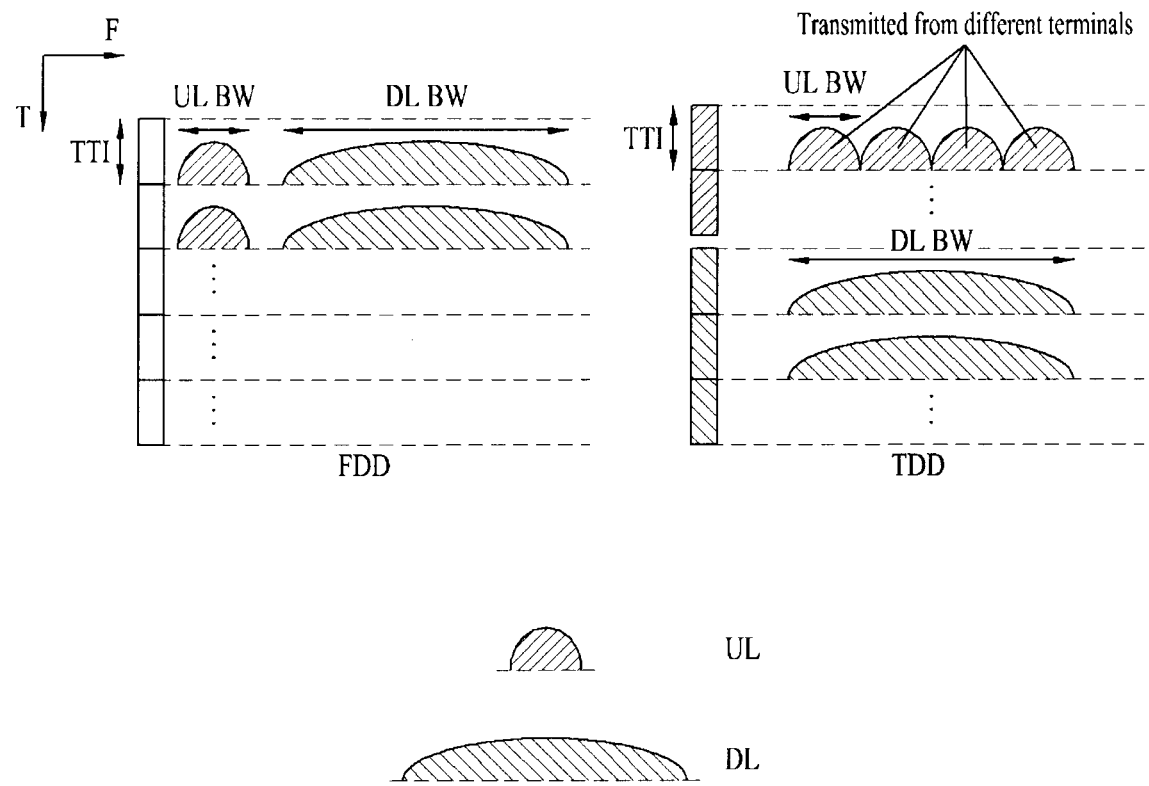
FIG. 6 illustrates exemplary asymmetric uplink/downlink configurations, when carrier aggregation is used.

FIG. 6 illustrates exemplary asymmetric UL/DL BW configurations, when carrier aggregation is used. In FIG. 6, a DL BW is larger than a UL BW in the same time resources (a TTI) in a Frequency Division Duplex (FDD) system. In a Time Division Duplex (TDD) system, uplink transmission/reception may be assigned to one time region (a TTI), whereas downlink transmission/reception may be assigned to another time region (a TTI). In addition, a DL BW is larger than a UL BW in the TDD system. For example, the UL BW may be configured with one carrier band and the DL BW may be configured with three carrier bands. With asymmetric UL/DL BW configurations as illustrated in FIG. 6, a system operation can be optimized more flexibly according to an uplink/downlink required transmission amount. That is, when there are more downlink transmission data than uplink transmission data, uplink resource waste can be prevented by an asymmetric UL/DL BW configuration as illustrated in FIG. 6.

Figure 7:
FIG. 7 is a conceptual view illustrating uplink and downlink carrier configurations.
Figure 7:
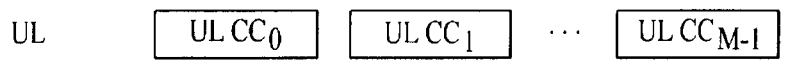

FIG. 7 is a conceptual view illustrating DL and UL CC configurations. Referring to FIG. 7, an eNB (cell) or an RN may allocate DL and UL CCs. For example, N DL CCs and M UL CCs may be configured. Here, N and M may be equal or different.

The eNB may indicate a unique CC configuration to a UE by dedicated signaling (UE-specific RRC signaling or UE-specific L1/L2 PDCCH signaling) after an RRC connection establishment procedure (cell search, acquisition/reception of system information, initial random access, etc.) is performed on a single DL CC and a single UL CC during initial access or initial deployment of the UE. Or when CCs are configured commonly for UEs on an eNB basis (on a cell or cell cluster basis), the CC configuration may be indicated to the UEs by cell-specific RRC signaling or cell-specific, UE-common L1/L2 PDCCH signaling. Or CC configuration information configured by an eNB may be indicated to a UE by system information used for RRC connection establishment, or by additional system information or cell-specific RRC signaling after the RRC connection establishment.

A DL/UL CC configuration is described, centering on the relationship between an eNB and a UE in the specification, which should not be construed as limiting the present invention. For example, the same description can be applied to an RN's DL/UL CC configuration for a UE within the coverage of the RN and an eNB's DL/UL CC configuration for an RN within the coverage of the eNB. While a DL/UL CC configuration is described below in the context of the relationship between an eNB and a UE for clarity of description, it is to be clearly understood that the same thing applies between an RN and a UE (an access uplink and an access downlink) and between an eNB and an RN (a backhaul uplink and a backhaul downlink).

A DL/UL linkage may be configured implicitly in the process of assigning unique DL/UL CCs to a UE or explicitly by defining a signaling parameter.

Figure 8:
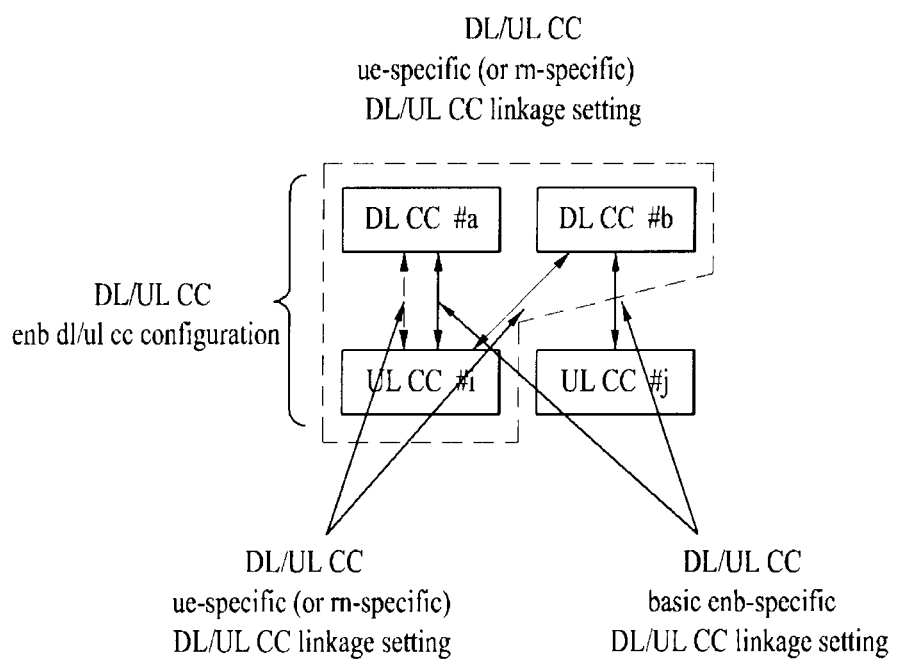
FIG. 8 illustrates an exemplary linkage between downlink carriers and uplink carriers.

FIG. 8 illustrates an exemplary linkage between DL CCs and UL CCs. Referring to FIG. 8, an eNB configures two DL CCs or DL cells, DL CC #a and DL CC #b and two UL CCs or UL cells, UL CC #i and UL CC #j and assigns the two DL CCs, DL CC #a and DL CC #b and one UL CC, UL CC #i to a UE. In the DL/UL CC linkage illustrated in FIG. 8, a solid line represents a basic linkage between DL CCs and UL CCs configured by the eNB. The basic linkage may be signaled by System Information Block 2 (SIB 2). In addition, a dotted line represents the DL/UL CC linkage for the specific UE. The DL/UL CC linkage illustrated in FIG. 8 is purely exemplary, not limiting the present invention. That is, in embodiments of the present invention, an eNB may configure various numbers of DL CCs and UL CCs and thus the numbers of UE-specific DL CCs and UL CCs configured or assigned from among the configured DL CCs and UL CCs may be set to any values. Therefore, a different DL/UL CC linkage from that illustrated in FIG. 8 may be defined.

A Primary CC (PCC) (Primary cell (P-cell)) or an anchor CC or cell may be set among DL CCs and UL CCs configured for or assigned to a UE. For example, a DL PCC (or DL P-cell) may be configured for the purpose of transmission of configuration or reconfiguration information in relation to RRC connection establishment, security, and information transfer to a higher layer. Or a UL PCC (or UL P-cell) may be configured for a UE to transmit a PUCCH carrying Uplink Control Information (UCI). Basically, one DL PCC (P-cell) and one UL PCC (P-cell) are configured specifically for each UE. Or when many CCs can be configured for a UE or a plurality of eNBs can configure CCs for the UE, each of one or more eNBs may configure one or more DL PCCs (P-cells) and/or UL PCCs (P-cells) for the UE. An eNB may configure a DL/UL PCC linkage UE-specifically. Or as defined already in LTE Rel-8, the DL/UL PCC linkage may be configured based on a basic linkage signaled by SIB 2. A DL PCC (P-cell) and a UL PCC (P-cell) that are linked in this manner may collectively be referred to as a UE-specific P-cell.

Channel State Information Feedback

To implement MIMO reliably, a receiver may feedback a Rank Indicator (RI), a Precoding Matrix Index (PMI), and a Channel Quality Indicator (CQI) to a transmitter. The RI, PMI, and CQI may collectively be called Channel State Information (CSI). Or the term 'CQI' may be used as a concept covering an RI, a PMI, and a CQI.

Figure 9:
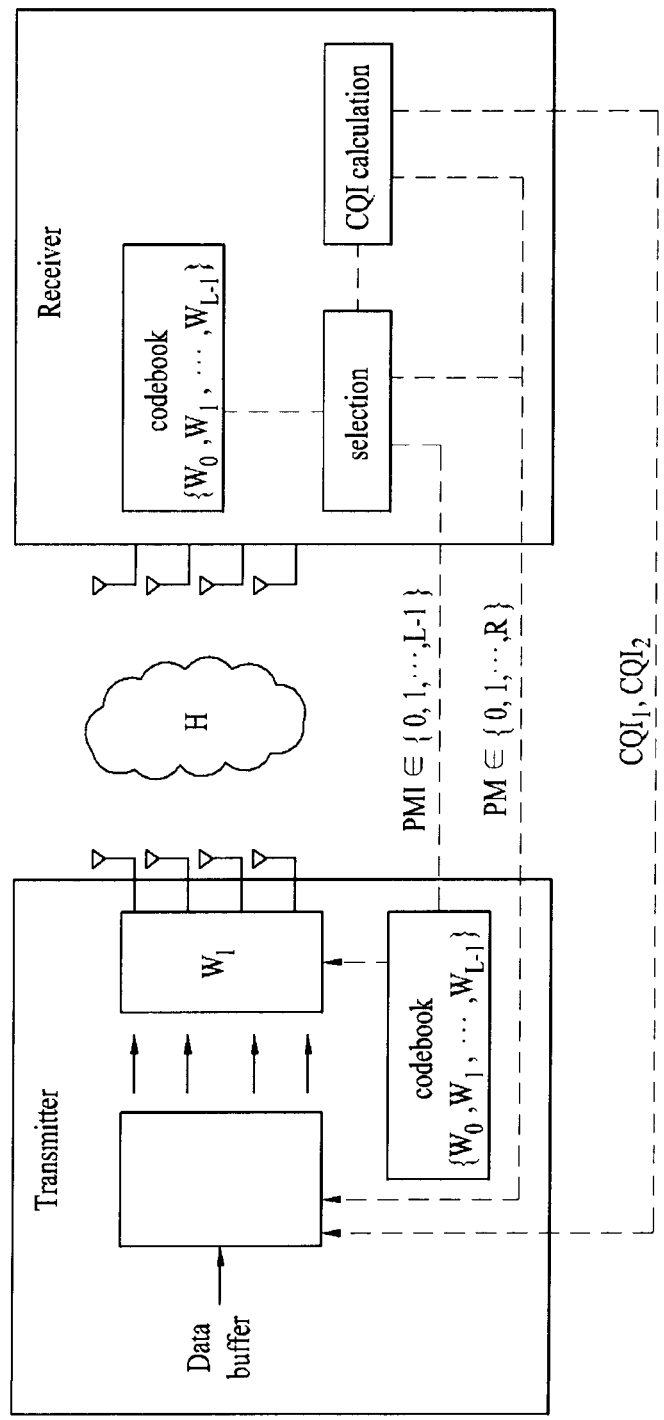
FIG. 9 is a view referred to for describing channel state information feedback.

FIG. 9 is a view referred to for describing CSI feedback. Referring to FIG. 9, a receiver may receive MIMO transmissions from a receiver on channels H. The receiver may select a preferred precoding matrix from a codebook based on the received signals and feedback the selected PMI to the transmitter. In addition, the receiver may measure the Signal-to-Interference plus Noise Ratios (SINRs) of the received signals, calculate a CQI based on the SINRs, and feedback the CQI to the transmitter. The transmitter may determine an appropriate number of layers, time/frequency resources, and Modulation and Coding Scheme (MCS) for data transmission to the receiver, using the RI and CQI feedback received from the receiver. The transmitter may also transmit a transmission signal precoded with a precoding matrix $W_1$ indicated by the PMI feedback through a plurality of antennas.

CSI will be detailed below.

An RI is information about a channel rank (i.e. the number of layers used for transmission at the transmitter). The RI is determined according to the number of allocated transmission layers, acquired from related DCI.

A PMI is information about a precoding matrix used for transmission at the transmitter. The receiver determines a precoding matrix to be fed back, taking into account the number of layers indicated by the RI. In case of closed-loop Spatial Multiplexing (SM) and large-delay CDD transmission, a PMI may be fed back. The transmitter may select a precoding matrix according to a predetermined rule in case of open-loop transmission. The receiver selects a PMI for each rank as follows. For each PMI, the receiver may calculate previously processed SINRs and convert the SINRs to a sum capacity. Then the receiver may select a best PMI based on the sum capacities. That is, the receiver's PMI calculation amounts to searching for a best PMI based on sum capacities. Upon receipt of a PMI feedback, the transmitter may use the PMI recommended by the receiver and indicate the use of the recommended PMI by a 1-bit indicator in a data transmission scheduling assignment. Alternatively, the transmitter may not use the precoding matrix indicated by the PMI received from the receiver. In this case, the transmitter may indicate a precoding matrix used for data transmission to the receiver, explicitly in scheduling allocation information.

A CQI is information representing channel quality. The CQI may be represented as a predetermined MCS combination. For example, a CQI index may be 4 bits (i.e. CQI index 0 to CQI index 15). Each CQI index indicates a modulation scheme and a code rate. The CQI may include various information about a UE that reports the CQI as well as channel quality information. That is, since a UE may feedback a different CQI index according to the performance of the UE despite the same channel quality, a certain criterion is defined for CQIs.

To calculate a CQI, a UE may receive a downlink Reference Signal (RS) from an eNB and evaluate a channel state using the received RS. The RS may be Common RS (CRS) defined in the legacy 3GPP LTE system or Channel Status Information RS (CSI-RS) defined in a system having an extended antenna configuration (e.g. the 3GPP LTE-A system). The UE may calculate a CQI index having a Block Error Rate (BLER) equal to or less than 10%, satisfying a given condition for CQI calculation, based on the channel state evaluated from the RS. The UE may transmit the calculated CQI index to the eNB. The UE does not use an interference estimation improving method in calculating a CQI index.

The process of evaluating a channel state and determining an appropriate MCS at a UE may be designed in various manners in terms of UE implementation. For example, the UE may calculate a channel state or effective SINR using an RS.

In addition, the channel state or effective SINR may be measured from a total system bandwidth (set S) or from a partial bandwidth (a specific subband or RB). A CQI for the set S and a CQI for a partial band are called a Wideband CQI (WB CQI) and a SubBand CQI (SB CQI), respectively. The UE may determine a highest MCS based on the calculated channel state or effective SINR. The highest MCS is an MCS that does not exceeds a BLER of 10% during decoding and satisfies a CQI calculation condition. The UE may determine a CQI index corresponding to the determined MCS and report the CQI index to the eNB.

A case where the UE transmits only a CQI (CQI-only transmission) may be considered. This happens when a CQI is transmitted aperiodically without data on a PUSCH. Aperiodic CQI transmission may be performed in an event-triggered manner upon request of the eNB. The eNB's request may be a 1-bit CQI request defined in DCI format 0. For CQI-only transmission, MCS index ($I_{MCS}$) 29 listed in [Table 1] below may be signaled. In this case, the CQI request bit of DCI format 0 may be set to 1, 4 or fewer RB-transmission may be set, Redundancy Version 1 (RV1) may be indicated for PUSCH data retransmission, and a modulation order Qm may be set to 2. That is, Quadrature Phase Shift Keying (QPSK) may be used as a modulation scheme in case of CQI-only transmission.

TABLE 1

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |

TABLE 1-continued

| MCS Index $I_{MCS}$ | Modulation Order $Q_m'$ | TBS Index $I_{TBS}$ | Redundancy Version $rv_{idx}$ |
|---|---|---|---|
| 28 | 6 | 26 | 0 |
| 29 | reserved | | 1 |
| 30 | | | 2 |
| 31 | | | 3 |

Now a detailed description will be given below of an operation for reporting CSI.

In the 3GPP LTE system, when a downlink receiving entity (e.g. a UE) is connected to a downlink transmitting entity (e.g. an eNB), the UE may measure the Reference Signal Received Power (RSRP) and Reference Signal Received Quality (RSRQ) of a downlink RS at a given time point and report the measurement result to the eNB periodically or in an event-triggered manner.

In a cellular OFDM wireless packet communication system, each UE may report downlink channel information to an eNB on an uplink according to a downlink channel state. The eNB may determine appropriate time/frequency resources, MCS, etc. for data transmission to each UE using downlink channel information received from the UE.

The channel information may include a CQI, a PMI, and an RI in the legacy 3GPP LTE system (e.g. 3GPP LTE Rel-8). All or a part of the CQI, PMI, and RI may be transmitted according to the transmission mode of each UE. A UE determines a CQI according to a received signal quality, which may be determined generally based on a downlink RS measurement. An actual CQI value transmitted to an eNB indicates an MCS that maintains a BLER at or below 10% and offers maximum performance, in relation to the measured received signal quality of the UE.

Channel information is reported periodically or aperiodically upon request of an eNB.

In case of periodic CSI reporting, the eNB sets a 1-bit CQI request for each UE in uplink scheduling information. Upon receipt of this information, the UE may transmit channel information on a PUSCH to the eNB, taking into account its transmission mode. It may be regulated that neither RI nor CQI/PMI is transmitted on the same PUSCH.

In periodic CSI reporting, the eNB signals the transmission period and offset of channel information to each UE by higher-layer signaling. The transmission period and offset of channel information are expressed in units of a subframe. The UE may transmit channel information on a PUCCH to the eNB in the given period, taking into account its transmission mode. In the presence of uplink transmission data in a subframe carrying channel information according to the predetermined period, the UE may transmit the channel information along with the transmission data on a PUSCH, not on the PUCCH. Periodic reporting on a PUCCH may use a limited number of bits, compared to on a PUSCH. An RI and a CQI/PMI may be transmitted on the same PUSCH.

If a periodic report collides with an aperiodic report in the same subframe, only the aperiodic report may be transmitted.

The latest transmitted RI may be used in calculating a WB CQI/PMI. An RI of PUCCH reporting mode is independent of an RI of PUSCH reporting mode. The former RI is valid only for a CQI/PMI of the PUSCH reporting mode.

Four CQI/PMI/RI feedback types may be defined for the PUCCH reporting mode. Type 1 is a CQI feedback for a UE-selected subband and Type 2 is a WB CQI and WB PMI feedback. Type 3 is an RI feedback and Type 4 is a WB CQI feedback/

Referring to [Table 2], four reporting modes, Mode 1-0, Mode 1-1, Mode 2-0, and Mode 2-1 may be defined according to CQI and PMI feedback types in periodic CSI reporting.

TABLE 2

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

WB CQI and SB CQI are defined according to CQI feedback types and No PMI and single PMI are defined according to transmission or non-transmission of PMI. In [Table 2], No PMI corresponds to Open-Loop (OL), Transmit Diversity (TD), and single-antenna, whereas single PMI corresponds to Closed-Loop (CL).

In Mode 1-0, a PMI is not transmitted and a WB CQI is transmitted. In this case, an RI is transmitted only in case of OL SM and a 4-bit WB CQI may be transmitted. If the RI exceeds 1, a CQI for a first codeword may be transmitted. In Mode 1-0, the afore-mentioned feedback type 3 and feedback type 4 may be multiplexed at different timings within a pre-determined reporting period, for transmission (this may be referred to Time Division Multiplexing (TDM)-CSI transmission).

In Mode 1-1, a single PMI and a WB CQI are transmitted. In this case, a 4-bit WB CQI and a 4-bit WB PMI may be transmitted along with an RI. If the RI exceeds 1, a 3-bit WB spatial differential CQI may be transmitted. In case of 2-codeword transmission, the WB spatial differential CQI may represent the difference between WB CQI indexes for codeword 1 and codeword 2. The difference may be one of a set {−4, −3, −2, −1, 0, 1, 2, 3}, expressed in 3 bits. In Mode 1-1, the afore-mentioned feedback type 3 and feedback type 4 may be multiplexed at different timings within a predetermined reporting period, for transmission.

In Mode 2-0, a PMI is not transmitted and a CQI for a UE-selected band is transmitted. In this case, an RI is transmitted only in case of OL SM and a 4-bit WB CQI may be transmitted. In addition, a 4-bit best CQI (Best-1 CQI) may be transmitted in each Bandwidth Part (BP). An L-bit indicator indicating Best-1 may be transmitted together. If the RI exceeds 1, a CQI for a first codeword may be transmitted. In Mode 2-0, the afore-mentioned feedback type 3 and feedback type 4 may be multiplexed at different timings within a pre-determined reporting period, for transmission.

In Mode 2-1, a single PMI and a CQI for a UE-selected band are transmitted. In this case, a 4-bit WB CQI, a 3-bit WB spatial differential CQI, and a 4-bit WB PMI may be transmitted along with an RI. Additionally, a 4-bit Best-1 CQI may be transmitted in each BP and together with an L-bit Best-1 indicator. If the RI is larger than 1, a 3-bit Best-1 spatial differential CQI may be transmitted. In case of 2-codeword transmission, the Best-1 spatial differential CQI may represent the difference between Best-1 CQI indexes for codeword 1 and codeword 2. In Mode 2-1, the afore-mentioned feedback type 1, feedback type 2 and feedback type 3 may be multiplexed at different timings within a predetermined reporting period, for transmission.

Each UE may receive information about the transmission period and offset of channel information by higher-layer RRC signaling. The UE may transmit channel information to the eNB based on the received information.

Aperiodic CQI, PMI, and RI transmission on a PUSCH will be described below.

In aperiodic reporting, an RI and a CQI/PMI may be transmitted on the same PUSCH. The RI report is valid only for the CQI/PMI report in the corresponding aperiodic reporting mode. CQI-PMI combinations supported for all rank values are listed in [Table 3]

TABLE 3

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI<br>RI<br>$1^{st}$ Wideband CQI (4 bit)<br>$2^{nd}$ Wideband CQI (4 bit) if RI > 1<br>subband PMIs on each subband |
| | UE Selected (Subband CQI) | Mode 2-0<br>RI (only for Open-Loop SM)<br>Wideband CQI (4 bit) + Best-M CQI (2 bit)<br>Best-M index<br>when RI > 1, CQI of first codeword | Mode 2-2: Multiple PMI<br>RI<br>$1^{st}$ Wideband CQI (4 bit) + Best-M CQI(2 bit)<br>$2^{nd}$ Wideband CQI (4 bit) + Best-M CQI(2 bit)<br>if RI > 1<br>Wideband PMI + Best-M PMI<br>Best-M index |

TABLE 3-continued

| | PMI Feedback Type | |
| --- | --- | --- |
| | No PMI (OL, TD, single-antenna) | with PMI (CL) |
| Higher layer-configured (subband CQI) | Mode 3-0<br>RI (only for Open-Loop SM)<br>Wideband CQI (4 bit) + subband CQI (2 bit) when RI > 1, CQI of first codeword | Mode 3-1: Single PMI<br>RI<br>$1^{st}$ Wideband CQI (4 bit) + subband CQI (2 bit)<br>$2^{nd}$ Wideband CQI (4 bit) + subband CQI (2 bit) if RI > 1<br>Wideband PMI |

In [Table 3], Mode 1-2 is about a WB feedback. A preferred precoding matrix for each subband may be selected from a codebook subset on the assumption of transmission only in the subband in Mode 1-2. The UE may report one WB CQI for each codeword. WB CQIs may be calculated on the assumption of transmission in subbands of the set S and using a selected precoding matrix for each subband. The UE may report a PMI selected for each subband. The following subband sizes listed in [Table 4] are available.

TABLE 4

| System Bandwidth $N_{RB}^{DL}$ | Subband Size (k) |
| --- | --- |
| 6-7 | NA |
| 8-10 | 4 |
| 11-26 | 4 |
| 27-63 | 6 |
| 64-110 | 8 |

Referring to [Table 3], Mode 3-0 and Mode 3-1 are about a higher layer-configured subband feedback.

In Mode 3-0, the UE may report a WB CQI calculated on the assumption of transmission in subbands of the set S. The UE may also report one SB CQI for each subband. The SB CQI may be calculated on the assumption of transmission only in the subband. Even though RI>1, both the WB CQI and the SB CQI may represent a channel quality for codeword 1.

In Mode 3-1, a single precoding matrix may be selected from a codebook subset on the assumption of transmission in subbands of the set S. The UE may report an SB CQI for each codeword in each subband. The SB CQI may be calculated on the assumption of using a single precoding matrix for all subbands and transmission in the corresponding subband. The UE may report a WB CQI for each codeword. The WB CQI may be calculated on the assumption of using a single precoding matrix for all subbands and transmission in subbands of the set S. The UE may report a selected single PMI. An SB CQI for each codeword may be expressed as a different from the WB CQI, using a 2-bit SB differential CQI offset. That is, the SB differential CQI offset is defined as the difference between an SB CQI index and a WB CQI index. The SB differential CQI offset may have one value selected from {-2, 0, +1, +2}. In addition, the subband sizes listed in [Table 4] are available.

Mode 2-0 and Mode 2-2 of [Table 3] are about a UE-selected subband feedback. Mode 2-0 and Mode 2-1 may be described briefly as reporting M best (best-M) averages.

In Mode 2-0, the UE may select a set of M preferred (i.e. best-M) subbands from the set S. The size of one subband is k. k and M may be given for each system bandwidth as illustrated in [Table 5] below. The UE may report one CQI reflecting transmission only in the selected best-M subbands. Even though RI>1, the CQI may represent a channel quality for codeword 1. In addition, the UE may report a WB CQI calculated on the assumption of transmission in subbands of the set S. Even though RI>1, the WB CQI may represent a channel quality for codeword 1.

TABLE 5

| | System Bandwidth | |
| --- | --- | --- |
| $N_{RB}^{DL}$ | Subband Size k (RBs) | M |
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select a set of M preferred (best-M) subbands from among the subbands of the set S (the size of one subband is k) and may select a preferred single precoding matrix from a codebook subset to be used for transmission in the selected M subbands. The UE may report one CQI per codeword, reflecting transmission only in the selected M subbands and use of the selected same precoding matrix for the M subbands. The UE may report a PMI corresponding to the single precoding matrix selected for the M subbands. Additionally, one precoding matrix (other than the precoding matrix for the selected M subbands) may be selected from the codebook subset on the assumption of transmission in the subbands of the set S. The UE may report a WB CQI per codeword, calculated on the assumption of transmission in the subbands of the set S and using the single precoding matrix for all subbands. The UE may report a PMI corresponding to the single precoding matrix selected for all subbands.

A CQI per codeword for the M selected subbands may be expressed as a difference from a WB CQI. The difference may be represented as a 2-bit differential CQI offset level which may have a value of the CQI index of the M selected subbands—a WB CQI index. An available differential CQI may be one of {+1, +2, +3, +4}.

Uplink Scheduling Control Information

A UE operating in conformance to the legacy LTE system (hereinafter, referred to as an LTE UE) performs blind decoding to receive PDCCHs allocated to the UE in a subframe. Blind decoding is the process of creating hypotheses associated with several formats (PDCCH DCI formats) of DCI and attempting PDCCH decoding based on each hypothesis. DCI may have various formats (e.g. various bit lengths) and the UE is supposed to perform PDCCH decoding without prior knowledge of the format of DCI. For example, if PDCCH decoding is successful based on a hypothesis, the UE may operate according to associated DCI. In contrast, if the decoding is failed, the UE may attempt PDCCH decoding based on another hypothesis associated with a DCI format. If a PDCCH received by blind decoding is destined for the UE, the UE may receive a PDSCH or transmit a PUSCH according to control information acquired from the PDCCH.

For example, if the LTE UE receives PDCCH DCI format 0, the LTE UE may acquire PUSCH scheduling information and transmit a PUSCH according to the acquired control information. DCI format 0 carries control information that schedules uplink single codeword transmission. This may be called UL grant information for uplink single codeword transmission. DCI format 0 may be defined as illustrated in [Table 6].

TABLE 6

| Format 0 | |
| --- | --- |
| Contents | Number of bit |
| Flag for format 0/format 1A differentiation | 1 bit |
| Hopping flag | 1 bit |
| Resource block assignment and hopping resource allocation | N bits |
| Modulation and coding scheme and redundancy version | 5 bits |
| New data indicator | 1 bit |
| TPC command for scheduled PUSCH | 2 bits |
| Cyclic shift for DMRS | 3 bits |
| UL index (for TDD) | 2 bits |
| Downlink Assignment Index (for TDD) | 2 bits |
| CQI request | 1 bit |

Each field of DCI format 0 illustrated in [Table 60 will be described in detail.

'Flag for format 0/ format 1A differentiation' is a field that distinguishes DCI format 0 from DCI format 1A. DCI format 1A schedules downlink transmission. Because DCI format 1A has the same payload size as DCI format 0, the field that makes DCI format 0 and DCI format 1A identical in format and distinguishes them from each other is included. If 'Flag for format 0/ format 1A differentiation' is 0, it indicates DCI format 0 and if 'Flag for format 0/ format 1A differentiation' is 1, it indicates DCI format 1A.

'Hopping flag' indicates whether PUSCH frequency hopping is used. If 'Hopping flag' is set to 0, it indicates that PUSCH frequency hopping is not applied and if 'Hopping flag' is set to 1, it indicates that PUSCH frequency hopping is applied. Frequency hopping refers to allocation of a PUSCH to different frequencies in the first and second slots of a subframe.

'Resource block assignment and hopping resource allocation' provides resource block allocation information for an uplink subframe according to whether PUSCH frequency hopping is used or not.

'Modulation and coding scheme and redundancy version' indicates the modulation order and Redundancy Version (RV) of a PUSCH. RV indicates a subpacket to be retransmitted at a retransmission. Among 32 states represented by 5-bit MCS indexes $I_{MCS}$, 0 to 28 may be used to indicate modulation orders and 29, 30 and 31 may indicate RV indexes (1, 2 and 3).

'New data indicator' indicates whether uplink scheduling information is for new data or retransmission data. If a current NDI has been toggled from an NDI for the previous transmission, the NDI indicates new data transmission. If the current NDI has not been toggled from the previous NDI, the NDI indicates retransmission data.

'TPC command for scheduled PUSCH' specifies a value by which to determine the transmission power of the PUSCH.

'Cyclic shift for DMRS' provides a cyclic shift value for use in generating an uplink DeModulation Reference Signal (DMRS) sequence. DMRS is a reference signal used for uplink channel estimation per antenna port or layer.

'UL index (for TDD)' may specify the index of a subframe configured for uplink transmission in a specific UL-DL configuration, when a radio frame is configured in TDD.

'Downlink Assignment Index (for TDD)' may indicate the total number of subframes configured for PDSCH transmission in the specific UL-DL configuration, in case of a TDD radio frame.

'CQI request' is a field requesting aperiodic CQI, PMI, and RI reporting on the PUSCH. If 'CQI request' is set to 1, the UE transmits an aperiodic CQI, PMI and RI report on the PUSCH.

CSI Feedback Methods in Multi-Carrier System

A description will be given of a downlink CSI transmission scheme defined in the legacy LTE system (e.g. conforming to 3GPP LTE Rel-8 or Rel-9) and various examples for transmitting downlink CSI in a multi-carrier system according to the present invention.

For dynamic link adaptation or downlink rank adaptation of downlink data transmission, the UE may report a downlink channel state to the eNB. Information about a downlink radio channel state may be reported on an uplink channel. An uplink control channel and an uplink data channel are available for CSI reporting.

The uplink control channel is characterized by a limited bandwidth and periodic transmission. An uplink control channel may be allocated and its transmission period may be set, by higher-layer signaling. The format of the uplink control channel (i.e. a PUCCH format) may be determined according to the type, modulation scheme, etc. of control information delivered on the uplink control channel. In the legacy LTE system, PUCCH format 1 is used for Scheduling Request (SR) transmission, PUCCH format 1a/1b are used for HARQ ACK/NACK transmission, PUCCH format 2 is used for CQI transmission, and PUCCH format 2a/2b is used for CQI and HARQ ACK/NACK transmission. 1- to 13-bit information may be reported in PUCCH format 2. Since the PUCCH formats defined in the legacy LTE system were designed for use in a single carrier system, they may not be suitable for a multi-carrier system. For example, CSI of downlink multiple carriers may have more control information than single-carrier CSI. Therefore, LTE PUCCH format 2 capable of delivering an up to 13-bit CQI may be insufficient for the multi-carrier system.

Meanwhile, the uplink data channel can carry more downlink CSI than the uplink control channel. CSI may be reported on the downlink data channel in a predetermined period or according to a command indicated by a predetermined control signal. For example, the legacy LTE system defines a PUSCH-based aperiodic CSI reporting mode. As described before, if the CQI request field included in a PDCCH of DCI format 0 is activated, a CQI may be transmitted in resources indicated by resource allocation information included in DCI format 0. Therefore, a channel capacity-related problem can be solved by transmitting a CQI about downlink multiple carriers on the PUSCH. However, the conventional PUSCH-based aperiodic CQI reporting mode is not applicable to the multi-carrier system. For example, while there is no need for indicating a downlink carrier for which a CQI is to be transmitted in the PUSCH-based aperiodic CQI transmission scheme of the legacy LTE system, the multi-carrier system may suffer from ambiguity unless a downlink carrier for which a CQI is to be transmitted is indicated.

Now a description will be given of a method for performing uplink transmission according to uplink scheduling control information in the multi-carrier system.

If a PDCCH received on the downlink at the UE carries uplink scheduling control information in DCI format 0 illustrated in [Table 6], the UE may transmit a PUSCH according to the uplink scheduling control information. If the uplink scheduling control information includes a periodic CQI report requesting message (e.g. when the CQI request field is activated), the UE may transmit a CQI in uplink resources allocated by the uplink scheduling control information.

Multiple carriers are not supported and downlink and uplink bandwidths are symmetrically configured in the legacy LTE system. Without the need for determining an uplink carrier for transmission or the size of the bandwidth of an uplink carrier to deliver a PUSCH, the UE may transmit the PUSCH according to uplink scheduling control information in the single carrier system.

Compared to the legacy LTE system, the LTE-A system can support multiple carriers and configure downlink and uplink bandwidths asymmetrically. If a UE operating in conformance to the LTE-A system (hereinafter, referred to an LTE-A UE) receives uplink scheduling control information (e.g. DCI format of [Table 6] or a newly defined UL grant DCI format), it cannot determine an uplink carrier on which to transmit a PUSCH (or an aperiodic CQI feedback).

Figure 10:
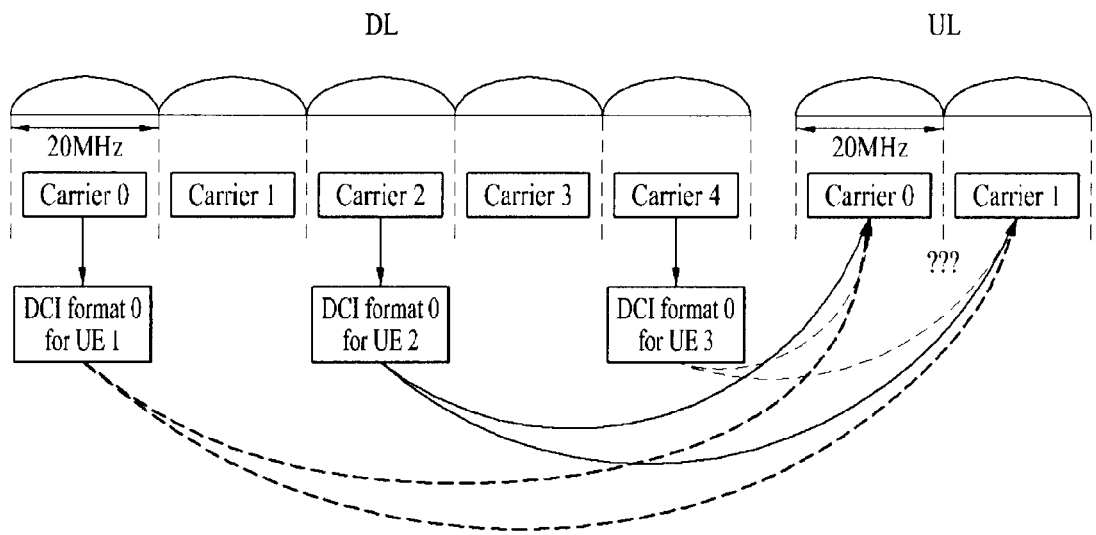
FIGS. 10 and 11 illustrate operations of a User Equipment (UE) for receiving uplink grant control information in a multi-carrier system.
Figure 11:
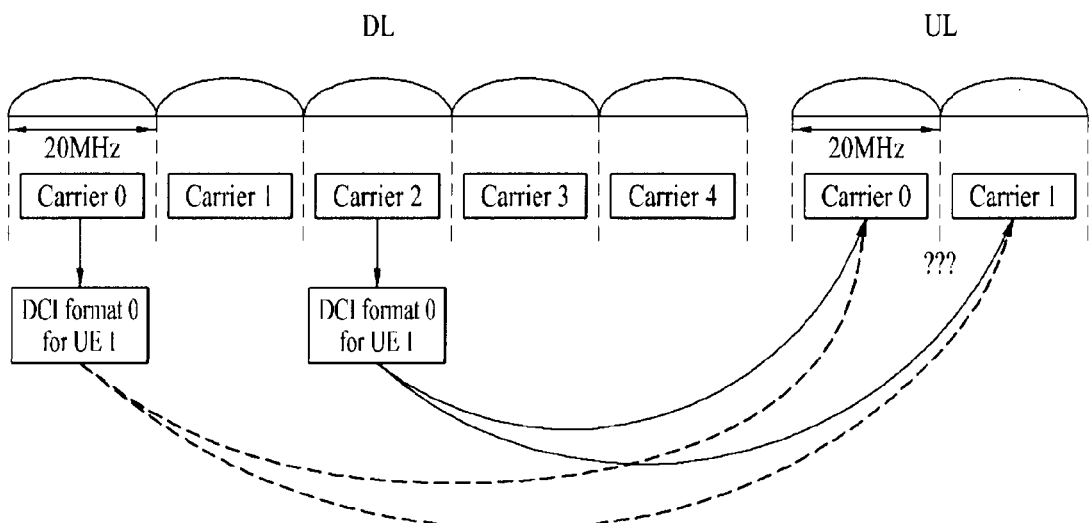

FIGS. 10 and 11 are views referred to for describing an operation for receiving UL grant control information at a UE in the multi-carrier system. In FIGS. 10 and 11, it is assumed that a downlink system bandwidth is 100MHz being an aggregate of first to fifth downlink carriers each having 20MHz, DL carrier 0 to DL carrier 4 and an uplink system bandwidth is 40MHz being an aggregate of first and second uplink carriers each having 20MHz, UL carrier 0 and UL carrier 1. The plurality of uplink and downlink carriers may be contiguous or non-contiguous in FIGS. 10 and 11.

Referring to FIG. 10, a first UE (UE 1), a second UE (UE 2), and a third UE (UE 3) receive UL grants on DL carrier 0, DL carrier 2, and DL carrier 4, respectively. When UE 1 receives a UL grant PDCCH on DL carrier 0, it cannot determine on which UL carrier between UL carrier 0 and UL carrier 1 to transmit a PUSCH. Similarly, although UE 2 receives a UL grant PDCCH on DL carrier 2, it cannot determine on which UL carrier between UL carrier 0 and UL carrier 1 to transmit a PUSCH. The same thing occurs to UE 3. That is, although UE 3 receives a UL grant PDCCH on DL carrier 4, it cannot determine on which UL carrier between UL carrier 0 and UL carrier 1 to transmit a PUSCH.

Referring to FIG. 11, UE 1 receives UL grants on a plurality of downlink carriers, DL carrier 0 and DL carrier 2. In this case, UE 1 cannot determine whether a UL grant received on each DL carrier is scheduling information for a PUSCH to be transmitted on UL carrier 0 or UL carrier 1.

Now a description will be given of various examples of reporting channel information accurately and efficiently in a multi-carrier environment, taking into account the above-described problems that can be generated in the multi-carrier environment according to the present invention.

As described before, one or more carriers may be defined for downlink transmission or uplink transmission in the multi-carrier system. Only a part of a plurality of carriers available (or configurable) to an eNB can be allocated for transmission and reception to and from a UE. For example, while an aggregate of up to 5 carriers can be used for downlink or uplink on the part of the eNB (or according to a system setting), the eNB may allocate an aggregate of 2 uplink carriers and an aggregate of 4 downlink carriers to a UE. The same number of or different numbers of downlink and uplink carriers may be allocated to the UE. The carriers allocated to the UE may be called activated carriers, whereas carriers configurable by the system but not allocated to the UE may be called deactivated carriers. Or the activated carriers may be carriers involved in data transmission for the UE and the deactivated carriers may be carriers excluded from the data transmission for the UE.

A DL-UL carrier linkage may be set. If the same number of downlink and uplink carriers are allocated to a UE, the downlink carriers may be linked to the uplink carriers in a one-to-one correspondence. On the other hand, if different plural downlink and uplink carriers are allocated to a UE, the downlink carriers may be linked to the uplink carriers asymmetrically.

Although an uplink carrier that will carry CSI of a downlink carrier may be determined to be an uplink carrier linked to the downlink carrier, a specific uplink carrier may be defined to carry the CSI. This specific uplink carrier may be called a UL primary carrier (P-cell or anchor-cell).

An uplink carrier to carry uplink control information (CSI of a downlink carrier, etc.) may be determined in the above manners, may be indicated by an eNB, or may be determined in a predetermined rule. Or when CSI of a downlink carrier is transmitted aperiodically, an uplink carrier to carry the CSI may be indicated by uplink scheduling information including a CQI request indicator. Even though an uplink carrier to carry uplink control information is determined, ambiguity still remains in transmitting downlink CSI in the multi-carrier system.

Specifically, control information for scheduling uplink multi-carrier transmission may be transmitted on a carrier selected from among downlink multiple carriers (e.g. DL carrier 0, 2 or 4 in FIG. 10). The uplink scheduling control information may include a feedback information request message (e.g. a CSI request) as well as uplink data transmission information. If the feedback information request message is activated, a UE may transmit downlink CSI on a PUSCH. However, if the UE receives uplink control information on one or more downlink carriers and a feedback information request message is activated in the uplink scheduling control information in the multi-carrier system, the UE cannot determine a downlink carrier for which CSI should be fed back. In this context, the present invention provides various embodiments to solve the problem.

Downlink Carrier For CSI Measurement and Reporting

A description will be given of various methods for determining a downlink carrier for which CSI is to be measured and reported when a UE receives a CSI request message according to the present invention.

According to the present invention, multiple downlink carriers are divided into two types according to a predetermined criterion, CSI or fine CSI is reported for a type-1 downlink carrier, and CSI is not reported or rough CSI is reported for a type-2 downlink carrier. Specific examples of the present invention will be described below.

In Method 1, CSI may be reported for all downlink carriers used in data transmission among multiple downlink carriers. The downlink carriers used for data transmission may be referred to as activated downlink carriers, as described before.

Specifically, only a part of a plurality of downlink carriers configurable by the system may be activated for a UE. Information indicating activated carriers involved in data transmission for the UE may be transmitted to the UE by higher-layer signaling or on a channel carrying downlink control information (e.g. downlink scheduling control information). The UE may determine downlink carriers for which CSI should be measured, based on the control information indicating the activated downlink carriers. In other words, a downlink carrier which should be measured by the UE may be indicated explicitly by higher-layer signaling or downlink control information or may be determined implicitly from activated carrier configuration information. In any case, a downlink carrier to be measured by the UE may be indicated by higher-layer signaling or downlink control information. Accordingly, upon receipt of uplink scheduling control information having an activated CSI request message, the UE may measure and report CSI of activated carriers involved in data transmission for the UE.

In Method 2, fine CSI may be reported for all downlink carriers used in data transmission among multiple downlink carriers, whereas rough CSI may be reported for carriers excluded in the data transmission. The downlink carriers used in data transmission may be called activated downlink carriers and the downlink carriers unused in the data transmission may be called deactivated downlink carriers.

Specifically, information indicating activated carriers used in data transmission may be transmitted to a UE by higher-layer signaling or on a downlink control information transmission channel. In other words, a downlink carrier to be measured by the UE may be indicated to the UE explicitly by higher-layer signaling or downlink control information or implicitly from activated carrier configuration information. In any case, a downlink carrier to be measured by the UE may be indicated by higher-layer signaling or downlink control information. Fine CSI of activated carriers involved in actual data transmission among multiple downlink carriers may be measured and reported. Compared to Method 1, CSI of deactivated carriers excluded in the downlink data transmission may also be measured and reported. One thing to note herein is that the CSI of the deactivated carriers is measured and reported at a rough level. The fine CSI may include all of, for example, a WB CQI/PMI and SB CQIs/PMIs, while the rough CSI may include a WB CQI/PMI without SB CQIs/PMIs.

In Method 3, CSI may be reported for all activated downlink carriers used in data transmission among multiple downlink carriers and CSI of one activated downlink carrier may be transmitted in one subframe. Therefore, when CSI of a plurality of activated downlink carriers are to be transmitted, CSI of the respective activated downlink carriers may be reported in a plurality of subframes in TDM. Specifically, upon receipt of uplink scheduling control information having an activated CSI request, a UE may transmits CSI of one activated downlink carrier in an uplink subframe indicated by the uplink scheduling control information and then may transmit CSI of the other activated downlink carriers in uplink subframes determined according to a predetermined period with respect to the uplink subframe.

In Method 4, downlink carriers are not divided depending on whether they are used for data transmission as in Method 1, Method 2 and Method 3. Rather, the downlink carriers are divided depending on whether they carry uplink scheduling control information. That is, a UE may measure and report CSI for a downlink carrier carrying uplink scheduling control information among multiple downlink carriers. If the UE detects and acquires PDCCHs carrying uplink scheduling control information from one or more downlink carriers, the UE may measure and report CSI for all of the downlink carriers. Additionally, the uplink scheduling control information may include an activated CSI request. For example, if a UE receives an uplink scheduling control information PDCCH having an activated CSI request on downlink carrier a, the UE may measure and report CSI for downlink carrier a. One or more downlink carriers on which a UE receives PDCCH may be referred to as serving downlink carriers (serving CCs or serving cells). That is, a downlink carrier for which the UE should measure and report CSI is a serving downlink carrier carrying uplink scheduling control information.

Methods for Measuring and Reporting CSI of Downlink Carrier

As described before, one or more downlink carriers for which CSI should be measured and reported can be determined in a system supporting multiple downlink carriers according to the above-described methods of the present invention. Hereinbelow, examples of determining how to generate and transmit CSI, taking into account multiple downlink carriers according to the present invention will be described.

Reporting Modes

First of all, a method for determining a CSI reporting mode for multiple downlink carriers will be described. For example, PUSCH-based CSI reporting modes may be categorized according to whether a PMI is not transmitted, a single PMI or multiple PMIS are transmitted, a WB CQI is transmitted, SB CQIs are transmitted, a CSI for a subband indicated by a higher layer is transmitted, etc. (e.g. the reporting modes illustrated in [Table 3]). The present invention defines various reporting modes and proposes methods for applying the reporting modes in relation to multiple downlink carriers.

When CSI is to be measured and reported for one or more downlink carriers, CSI of the one or more downlink carriers may be reported in the same reporting mode. For example, if a UE is supposed to measure and report CSI for two downlink carriers, the UE may transmit CSI of the two downlink carriers in PUSCH reporting mode 1-2 (refer to [Table 3]).

If one or more downlink carriers are determined for CSI measurement and reporting, CSI of downlink carriers (i.e. activated downlink carriers) involved in data transmission among the downlink carriers may be transmitted in the same reporting mode. For example, fine CSI may be transmitted for an activated downlink carrier, while rough CSI may be transmitted for a deactivated downlink carrier, according to Method 2 for determining a downlink carrier for CSI measurement and reporting. Although CSI of activated downlink carriers may be transmitted in the same PUSCH reporting mode, it is not necessary to transmit CSI of deactivated downlink carriers in the same reporting mode.

If one or more downlink carriers are determined for CSI measurement and reporting, CSI of downlink carriers (activated downlink carriers) involved in data transmission among the downlink carriers may be transmitted in the same reporting mode and CSI of downlink carriers (deactivated downlink carriers) excluded from the data transmission may be reported in a default reporting mode. The default reporting mode may be preset to, for example, a reporting mode that has the lowest control information overhead or a reporting mode that is applied to a basic downlink transmission mode (e.g. a downlink single antenna port transmission mode).

If one or more downlink carriers are determined for CSI measurement and reporting, a different reporting mode may be set for each of the downlink carriers. For example, a reporting mode for each downlink carrier may be indicated to a UE by an eNB or preset. Therefore, upon receipt of uplink scheduling control information having an activated CQI request indicator, the UE may transmit CSI of each downlink carrier in a reporting mode set for the downlink carrier.

Rank Information

Methods for determining rank information for each downlink carrier when CSI is reported for multiple downlink carriers will be described.

One method for determining rank information is that if one or more downlink carriers are determined for CSI measurement and reporting, rank information is determined for each downlink carrier independently (i.e. independently of other downlink carriers).

Another method is that if one or more downlink carriers are determined for CSI measurement and reporting, all of the downlink carriers are restricted to the same rank information (i.e. a common rank value). Therefore, the amount of feedback information requires for rank information transmission can be reduced. A rank information reporting method defined in the legacy LTE system may be adopted as this rank information transmission method.

Modulating and Coding Schemes

A description will be given of methods for determining an MCS for CSI of each downlink carrier in reporting CSI of multiple downlink carriers.

One MCS determining method is that if one or more downlink carriers are determined for CSI measurement and reporting, CSI of each downlink carrier is separately encoded and modulated with the same modulation order.

Another MCS determining method is that if rank information is independently reported for each downlink carrier, the rank information of each downlink carrier is separately encoded and modulated with the same modulation order.

Frequency Granularity

Methods for determining a frequency granularity with which to measure CSI of each downlink carrier in reporting CSI of multiple downlink carriers will be described below.

One of the methods for determining a frequency granularity is to determine a CSI measurement frequency granularity independently for each downlink carrier, when one or more downlink carriers are determined for CSI measurement and reporting.

Another method for determining a frequency granularity is to determine the same CSI measurement frequency granularity for each downlink carrier, when one or more downlink carriers are determined for CSI measurement and reporting.

Transmission of Multiple Uplink Transport Blocks

In the LTE-A system supporting an extended antenna configuration, up to 2 uplink Transport Blocks (TBs) may be transmitted in up to 4 transmission layers. An uplink transmission mechanism will be described briefly. A TB is a coding unit of uplink information bits to be transmitted. That is, information is input in TBs to an encoder, for uplink transmission and a CodeWord (CW) is an encoder output. One TB may be mapped to one CW. If one of two TBs is deactivated and the other TB is activated, the activated TB may be mapped to a first CW (CW 0). TB deactivation covers a case where the size of a TB is 0. If a TB is 0 in size, the TB is not mapped to a CW. A CW is modulated to complex symbols in a modulation scheme determined according to the type and/or channel state of the transmission signal. The modulated complex symbols are mapped to one or more layers. One CW may be mapped to one layer on a symbol basis or one CW may be distributed to a plurality of layers (e.g. up to 4 layers). The layer-mapped signals may be subject to transform precoding (e.g. by Discrete Fourier Transform (DFT)). Then the DFT-precoded signal may be multiplied by a precoding matrix selected according to the channel state and allocated to transmission antennas. The antenna-specific transmission signals may be mapped to time-frequency REs and transmitted through the antennas after being processed in OFDM signal generators.

Meanwhile, in the legacy LTE system supporting downlink transmission through up to 4 transmission antennas on a single carrier, it is regulated that in case of aperiodic CQI-only transmission from a UE, the CQI request bit of DCI format 0 is set to 1, MCS index ($I_{MCS}$) 29 is signaled, RV 1 is indicated, and CSI is transmitted in four PRBs (i.e. $N_{PRB} \leq 4$). The modulation order $Q_m$ of the CSI is set to 2 (i.e. QPSK).

Compared to the LTE system, the LTE-A system can support downlink transmission through up to 8 transmission antennas and adopt the multi-carrier technology. When the number of transmission antennas at a transmitter and the number of carriers are increased, the size of payload of CSI (CQI/PMI/RI) to be reported by a UE is also increased. Thus, there is a need for providing sufficient space for transmitting CSI. In order to increase capacity for CSI reporting, the number of PRBs, $N_{PRB}$ may be increased, relative to a conventional number of PRBs (e.g. 4 RBs).

In addition, MCS indexes $I_{MCS}$, RVs, and NDIs may be provided for two uplink TBs by control information that schedules uplink multi-TB transmission (e.g. DCI format 4).

Now, a description will be given of methods for transmitting CSI for each downlink carrier and uplink data, when CSI is reported for multiple downlink carriers in a system supporting uplink multi-TB transmission.

One of the methods is to transmit CSI for multiple downlink carriers in a TB (e.g. a first TB) indicated by MCS index 29 in uplink multi-antenna-multi-layer transmission, when uplink scheduling information indicates $N_{PRB} \leq 4$ and a CSI request is activated in the uplink scheduling information. In addition, uplink data may be transmitted in a TB (e.g. a second TB) indicated by an MCS index other than $I_{MCS}=29$. Both a CQI and an RI may be reported in one RB (e.g. the first TB).

Another method is to transmit CSI for multiple downlink carriers in a TB (e.g. a first TB) indicated by MCS index 29 in uplink multi-antenna-multi-layer transmission, when uplink scheduling information indicates $N_{PRB} \leq 4$ and a CSI request is activated in the uplink scheduling information. In addition, uplink data may be transmitted in a TB (e.g. a second TB) indicated by an MCS index other than $I_{MCS}=29$. Herein, a CQI may be reported in one TB (e.g. the first TB) and an RI may be reported repeatedly in all layers (i.e. layers mapped to the first and second TBs). Repeated reporting of an RI in all layers means that duplicates of the same RI information are transmitted in all layers.

A third method is to use all REs for reporting CSI for multiple downlink carriers in a TB indicated by MCS index 29 in uplink multi-antenna-multi-layer transmission, when uplink scheduling information indicates $N_{PRB} \leq 4$ and a CSI request is activated in the uplink scheduling information. In addition, uplink data and CSI for multiple downlink carriers may be transmitted in a TB (e.g. a second TB) indicated by an MCS index other than $I_{MCS}=29$. Herein, a CQI for one of the multiple downlink carriers may be reported in one RB (e.g. a first TB), and a common RI for all downlink carriers may be reported repeatedly in all layers (i.e. layers mapped to the first and second TBs).

Figure 12:
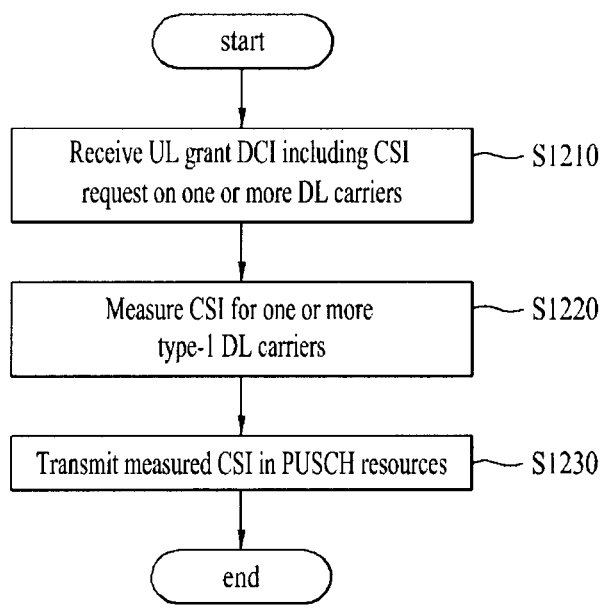
FIG. 12 is a flowchart illustrating a method for transmitting channel state information in a wireless communication system supporting multiple carriers according to the present invention.

FIG. 12 is a flowchart illustrating a CSI transmission method in the multi-carrier wireless communication system according to the present invention.

A UE may receive UL grant DCI including a CSI request from an eNB on one or more downlink carriers in step S1210. The UE may acquire the UL grant DCI by detecting a PDCCH.

In step S1220, the UE may measure CSI for one or more type-1 downlink carriers. The type-1 downlink carriers may be downlink carriers used for downlink data transmission. Or the type-1 downlink carriers may be downlink carriers carrying the UL grant DCI in step S1210. The type-1 downlink carriers may be indicated by higher-layer signaling.

Downlink carriers configurable in the wireless communication system may include type-1 downlink carrier and type-2 downlink carriers. That is, the remaining downlink carriers other than the type-1 downlink carriers are the type-2 downlink carriers. For example, the type-2 downlink carriers may be downlink carriers unused in downlink data transmission. Or the type-2 downlink carriers may be downlink carriers that do not carry the UL grant DCI in step S1210.

In step S1230, the UE may transmit CSI measured in step S1220 in uplink resources (PUSCH resources) indicated by the UL grant DCI received in step S1210 to the eNB.

In accordance with an embodiment of the present invention, CSI may not be measured and reported for a type-2 downlink carrier. Or fine CSI may be measured and reported for a type-1 downlink carrier, while rough CSI may be measured and reported for a type-2 downlink carrier.

The afore-described various embodiments of the present invention may be applied independently or in combination of two or more embodiments to the CSI transmission method for multiple downlink carriers of the present invention described with reference to FIG. 12. Redundant descriptions are avoided herein.

The same principle proposed by the present invention is also applicable to a method for transmitting CSI for multiple carriers on a backhaul downlink from an eNB to an RN and a method for transmitting CSI for multiple carriers on an access downlink from an RN to a UE.

Figure 13:
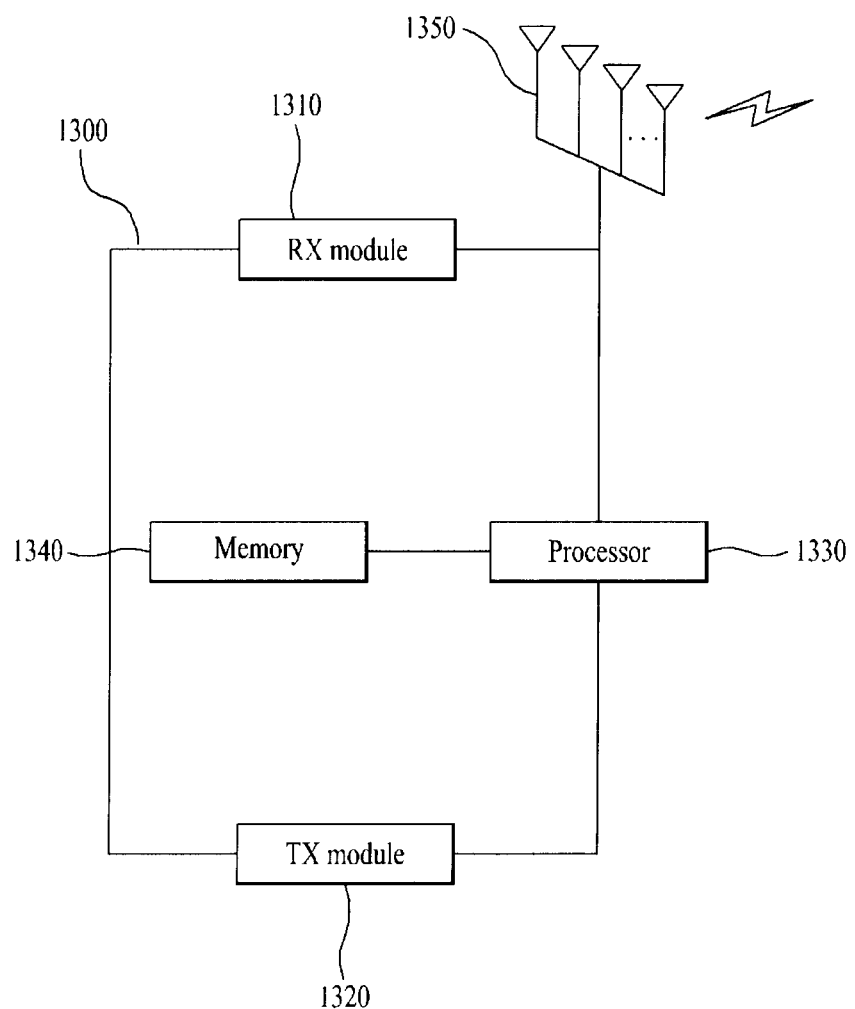
FIG. 13 is a block diagram of a UE according to a preferred embodiment of the present invention.

FIG. 13 is a block diagram of a UE according to a preferred embodiment of the present invention.

Referring to FIG. 13, a UE 1300 may include a Reception (Rx) module 1310, a Transmission (Tx) module 1320, a processor 1330, a memory 1340, and a plurality of antennas 1350. The plurality of antennas 1350 are a UE device supporting MIMO transmission and reception. The Rx module 1310 may receive signals, data, and information on a downlink from an eNB. The Tx module 1320 may transmit signals, data, and information on an uplink to the eNB. The processor 1330 may provide overall control to the operations of the UE 1300.

In accordance with an embodiment of the present invention, the UE 1300 may be configured so as to transmit downlink CSI in a wireless communication system supporting multiple downlink carriers. The processor 1330 of the UE 1300 may be configured so as to receive UL grant DCI including a CSI request on one or more downlink carriers through the Rx module 1310. In addition, the processor 1330 may be configured to measure CSI for one or more type-1 downlink carriers. The processor 1330 may also be configured to transmit the measured CSI in PUSCH resources indicated by the UL grant DCI through the Tx module. Herein, multiple downlink carriers may be divided into type-1 downlink carriers and type-2 downlink carriers, and CSI may not be transmitted for the type-2 downlink carriers. Or fine CSI may be measured and transmitted for a type-1 downlink carrier, whereas rough CSI may be measured and transmitted for a type-2 downlink carrier.

Besides, the processor 1330 of the UE 1300 may process information received at the UE 1300 and information to be transmitted to the outside. The memory 1340 may store the processed information for a predetermined time and may be replaced with a component such as a buffer (not shown).

The afore-described various embodiments of the present invention may be applied independently or in combination of two or more embodiments to the above specific configurations of the eNB and the UE. Redundant descriptions are avoided herein, for clarity.

The same description of the UE 1300 given with reference to FIG. 13 is applicable to an RN as a downlink receiving entity or an uplink transmitting entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

Industrial Applicability

The above-described embodiments of the present invention are applicable to various mobile communication systems.

The invention claimed is:

1. A method for transmitting downlink Channel State Information (CSI) in a wireless communication system supporting multiple downlink carriers, the method comprising:
receiving uplink grant Downlink Control Information (DCI) including a Channel Quality Indicator (CQI) request on one or more downlink carriers;
measuring first CSI for one or more first-type downlink carriers and second CSI for one or more second-type downlink carriers; and
transmitting the first CSI and the second CSI in Physical Uplink Shared Channel (PUSCH) resources indicated by the uplink grant DCI, wherein the multiple downlink carriers include the first-type downlink carriers and second-type downlink carriers, and wherein the first CSI includes a greater number of CSI types than the second CSI.

2. The method according to claim 1, wherein the first-type downlink carriers are downlink carriers used in downlink data transmission and the second-type downlink carriers are downlink carriers unused in the downlink data transmission.

3. The method according to claim 1, wherein the first-type downlink carriers are downlink carriers that carry the uplink grant DCI and the second-type downlink carriers are downlink carriers that do not carry the uplink grant DCI.

4. The method according to claim 1, wherein the first CSI includes wideband Channel Quality Information (CQI) and subband CQI, and wherein the second CSI includes the subband CQI and does not include the wideband CQI.

5. The method according to claim 1, wherein the first-type downlink carriers are set by higher-layer signaling, and wherein the CSI transmission comprises transmitting CSI for each of the one or more first-type downlink carriers in a different uplink subframe.

6. The method according to claim 1, wherein the same mode is applied to each of the one or more first-type downlink carriers, and wherein an independent mode is applied to each of the one.

7. The method according to claim 1, wherein the CSI measurement comprises measuring the CSI with an independent granularity for each of the one or more first-type downlink carriers.

8. The method according to claim 1, wherein the CSI transmission comprises reporting independent rank information for each of the one or more first-type downlink carriers.

9. The method according to claim 8, wherein the rank information for each of the one or more first-type downlink carriers is separately encoded and modulated with the same modulation order.

10. The method according to claim 1, wherein the CSI is transmitted for the one or more first-type downlink carriers in a first uplink transport block indicated by the downlink control information and uplink data is transmitted in a second transport block that is not indicated by the downlink control information.

11. The method according to claim 10, wherein only the CSI is transmitted in the first uplink transport block and the uplink data and the CSI are transmitted in the second uplink transport block.

12. The method according to claim 10, wherein a CQI and a Rank Indicator (RI) for the one or more first-type downlink carriers are transmitted in the first uplink transport block.

13. The method according to claim 10, wherein the CSI transmission comprises transmitting the CQI for the one or more first-type downlink carriers in the first uplink transport block and repeatedly transmitting the RI for the one or more first-type downlink carriers in the first uplink transport block and the second uplink transport block.

14. The method according to claim 10, wherein the downlink control information indicating the first uplink transport block includes a Modulation and Coding Scheme (MCS) level index ($I_{MCS}$) set to 29 for the one or more first-type downlink carriers.

15. A user equipment for transmitting downlink Channel State Information (CSI) in a wireless communication system supporting multiple downlink carriers, comprising:

a reception module for receiving a downlink signal from a base station;

a transmission module for transmitting an uplink signal to the base station; and a processor for controlling the user equipment including the reception module and the transmission module, wherein the processor is configured to receive uplink grant Downlink Control Information (DCI) including a Channel Quality Indicator (CQI) request on one or more downlink carriers through the reception module, measure first CSI for one or more first-type downlink carriers and second CSI for one or more second-type downlink carriers, and transmit the first CSI and the second CSI in Physical Uplink Shared Channel (PUSCH) resources indicated by the uplink grant DCI through the transmission module, and wherein the multiple downlink carriers include the first-type downlink carriers and second-type downlink carriers, and wherein the first CSI includes a greater number of CSI types than the second CSI.

* * * * *